US011315128B2

(12) United States Patent
Higuchi et al.

(10) Patent No.: US 11,315,128 B2
(45) Date of Patent: Apr. 26, 2022

(54) CHARGING SYSTEM, CHARGING METHOD, AND PROGRAM

(71) Applicant: MITSUBISHI HEAVY INDUSTRIES MACHINERY SYSTEMS, LTD., Kobe (JP)

(72) Inventors: Tatsuya Higuchi, Tokyo (JP); Atsushi Iida, Tokyo (JP); Yohei Kojima, Tokyo (JP); Kazuyoshi Kitajima, Tokyo (JP)

(73) Assignee: MITSUBISHI HEAVY INDUSTRIES MACHINERY SYSTEMS, LTD., Kobe (JP)

( * ) Notice: Subject to any disclaimer, the term of this patent is extended or adjusted under 35 U.S.C. 154(b) by 458 days.

(21) Appl. No.: 16/496,829

(22) PCT Filed: Mar. 29, 2017

(86) PCT No.: PCT/JP2017/013019
§ 371 (c)(1),
(2) Date: Sep. 23, 2019

(87) PCT Pub. No.: WO2018/179171
PCT Pub. Date: Oct. 4, 2018

(65) Prior Publication Data
US 2020/0311743 A1 Oct. 1, 2020

(51) Int. Cl.
*G06Q 30/00* (2012.01)
*G06K 7/10* (2006.01)
(Continued)

(52) U.S. Cl.
CPC ..... *G06Q 30/0185* (2013.01); *G06K 7/10366* (2013.01); *G06Q 20/085* (2013.01);
(Continued)

(58) Field of Classification Search
CPC ............. G06Q 30/0185; G06Q 20/085; G06Q 2240/00; G06K 7/10366; G06K 19/0723;
(Continued)

(56) References Cited

U.S. PATENT DOCUMENTS 8,321,264 B2* 11/2012 Goldmann ............. G08G 1/017
705/13
2005/0022000 A1 1/2005 Inomata et al.

FOREIGN PATENT DOCUMENTS

JP  H09-167985 A  6/1997
JP  2000-182109 A  6/2000
(Continued)

OTHER PUBLICATIONS

PCT/ISA/210, "International Search Report for International Application No. PCT/JP2017/013019," dated Jun. 13, 2017.
(Continued)

*Primary Examiner* — Sonji N Johnson
(74) *Attorney, Agent, or Firm* — Manabu Kanesaka; Benjamin Hauptman; Kenneth Berner (57) ABSTRACT

A charging system for communicating with an RFID tag on a vehicle traveling with the RFID tag attached thereto, and thereby performing charging processing in relation to the vehicle. The charging system is provided with: an RFID information acquisition unit for acquiring RFID information written onto an RFID tag detected by a roadside communication device for communicating with the RFID tag; an external appearance information acquisition unit for acquiring external appearance information relating to the RFID tag or a vehicle body of the vehicle; a point computation unit for determining the respective invalidity of each of a plurality of pieces of determination information, including external appearance determination information in which the RFID information and the external appearance information are combined, and calculating points on the basis of the inva-
(Continued)

lidity; and a determining unit for determining whether or not the vehicle is a fraudulent vehicle on the basis of the points.

9 Claims, 6 Drawing Sheets

(51) Int. Cl.
- *G06Q 20/08* (2012.01)
- *G07B 15/06* (2011.01)
- *G06V 10/40* (2022.01)
- *G06V 20/62* (2022.01)
- *B60R 16/023* (2006.01)
- *G06V 30/10* (2022.01)

(52) U.S. Cl.
CPC .............. *G06V 10/40* (2022.01); *G06V 20/62* (2022.01); *G07B 15/063* (2013.01); *B60R 16/023* (2013.01); *G06Q 2240/00* (2013.01); *G06V 30/10* (2022.01)

(58) Field of Classification Search
CPC ........ G06V 10/40; G06V 20/62; G06V 30/10; G07B 15/063; G07B 15/06; G07B 15/00; B60R 16/023
See application file for complete search history.

(56) References Cited

FOREIGN PATENT DOCUMENTS

| | | |
|---|---|---|
| JP | 2003-263664 A | 9/2003 |
| JP | 2004-227026 A | 8/2004 |
| JP | 2005-044277 A | 2/2005 |
| JP | 2011-076406 A | 4/2011 |

OTHER PUBLICATIONS

PCT/ISA/237, "Written Opinion of the International Searching Authority for International Application No. PCT/JP2017/013019," dated Jun. 13, 2017.

\* cited by examiner

CHARGING SYSTEM, CHARGING METHOD, AND PROGRAM

RELATED APPLICATIONS

The present application is National Phase of International Application No. PCT/JP2017/013019 filed Mar. 29, 2017, the disclosure of which is hereby incorporated by reference herein in its entirety.

TECHNICAL FIELD

The present invention relates to a charging system, a charging method, and a program.

BACKGROUND ART

Currently, on toll roads such as expressways, it is known to charge a toll (a toll charge) of an amount corresponding to a vehicle type classification of a traveling vehicle.

As a related technology, Patent Document 1 discloses a toll charging system that automatically identifies a traveling vehicle using Radio Frequency Identification (RFID).

CITATION LIST

Patent Document

Patent Document 1: JP H09-167985 A

SUMMARY OF INVENTION

Technical Problem

When RFID is used in the toll charging system, it is possible to pass through a toll charging system at a toll that is cheaper than a standard toll, by fraudulently replacing an RFID tag installed in a vehicle with that of another vehicle. However, the toll charging system disclosed in Patent Document 1 cannot surmise a vehicle in which the RFID tag is being fraudulently used in such a manner.

Therefore, an object of the present invention is to provide a charging system, a charging method, and a program that are capable of surmising a vehicle that is fraudulently using an RFID tag.

Solution to Problem

A charging system (100) of a first aspect is a charging system that communicates with an RFID tag (α) on a traveling vehicle (A) in which the RFID tag is installed, and performs charging processing in relation to the vehicle. The charging system includes an RFID information acquisition unit (53) configured to acquire RFID information written onto the RFID tag detected by a roadside communication device (40) that communicates with the RFID tag, an external appearance information acquisition unit (55) configured to acquire external appearance information relating to one of the RFID tag and a vehicle body of the vehicle, a point computation unit (56) configured to determine invalidity of a plurality of pieces of determination information including external appearance determination information in which the RFID information and the external appearance information are combined and to calculate a point on the basis of the invalidity, and a determining unit (57) configured to determine whether or not the vehicle is a fraudulent vehicle on the basis of the point.

According to the present aspect, the charging system uses a point system to determine the respective invalidity of the plurality of pieces of determination information including the external appearance determination information in which the RFID information and the external appearance information are combined. Thus, the charging system can determine the vehicle in which the RFID tag is being fraudulently used, from the plurality of pieces of determination information, without relying on the single external appearance information. As a result, the charging system can surmise the vehicle in which the RFID tag is being fraudulently used.

The charging system of a second aspect is the charging system of the first aspect, in which the point computation unit determines each of invalidity points as the respective invalidity, and calculates an overall point by integrating the invalidity points.

According to the present aspect, since the overall point is calculated by integrating the invalidity points, the charging system can perform the determination by collectively handling the respective invalidities.

A charging system of a third aspect charging system of the second aspect in which the point computation unit calculates the overall point while applying weighting to each of the invalidity points.

According to the present aspect, since the weighting is applied to the invalidity points, the charging system can perform the determination while applying weighting to each of the invalidities.

The charging system of a fourth aspect is the charging system of any one of the first to third aspects further including an alarm acquisition unit (54) configured to acquire tamper alarm information detected by the RFID tag, and in which the point computation unit calculates the point on the basis of the tamper alarm information in addition to the invalidity.

According to the present aspect, since the point is calculated on the basis of the tamper alarm information, the charging system can detect whether the RFID tag has been peeled off in the past. Thus, the charging system can determine the fraudulent vehicle in which the RFID tag is mounted that has been fraudulently peeled off in order to be transferred.

A charging system of a fifth aspect is the charging system of any one of the first to fourth aspects in which the external appearance information acquisition unit includes a vehicle height information acquisition unit (55A) configured to acquire estimated vehicle height information on the basis of a received signal strength from the RFID tag, as the external appearance information.

According to the present aspect, since the estimated vehicle height information is acquired as the external appearance information, the charging system can determine the fraudulent vehicle having a vehicle height that is different from that of the vehicle type identified by the RFID information.

A charging system of a sixth aspect is the charging system of any one of the first to fifth aspects in which the external appearance information acquisition unit includes a vehicle number acquisition unit (55B) configured to acquire a vehicle number of the vehicle, using image processing, as the external appearance information.

According to the present aspect, since the vehicle number is acquired as the external appearance information, the charging system can determine the fraudulent vehicle having a vehicle number that is different from the vehicle number identified by the RFID information.

A charging system of a seventh aspect is the charging system of any one of the first to fifth aspects in which the external appearance information acquisition unit includes a tag external appearance acquisition unit (55C) configured to acquire an external appearance pattern of the RFID tag, using image processing, as the external appearance information.

According to the present aspect, since the external appearance of the RFID tag is acquired as the external appearance information, the charging system can determine the fraudulent vehicle in which the RFID tag is installed that has the external appearance that is different from the external appearance identified by the RFID information.

A charging method of an eighth aspect is a charging method for communicating with an RFID tag on a traveling vehicle in which the RFID tag is installed, and for performing charging processing in relation to the vehicle. The charging method includes an RFID information acquiring step for acquiring RFID information written onto the RFID tag detected by a roadside communication device that communicates with the RFID tag, an external appearance information acquiring step for acquiring external appearance information relating to one of the RFID tag and a vehicle body of the vehicle, a point computing step for determining a respective invalidity of each of a plurality of pieces of determination information including external appearance determination information in which the RFID information and the external appearance information are combined and for calculating a point on the basis of the invalidity, and a point determining step for determining whether the vehicle is a fraudulent vehicle on the basis of the point.

A program of a ninth aspect is a program for causing a computer of a charging system that communicates with an RFID tag on a traveling vehicle in which the RFID tag is installed, and performs charging processing in relation to the vehicle, to function as an RFID information acquisition unit configured to acquire RFID information written onto the RFID tag detected by a roadside communication device that communicates with the RFID tag, an external appearance information acquisition unit configured to acquire external appearance information relating to one of the RFID tag and a vehicle body of the vehicle, a point computation unit configured to determine a respective invalidity of each of a plurality of pieces of determination information including external appearance determination information in which the RFID information and the external appearance information are combined, and to calculate a point on the basis of the invalidity, and a point determining unit configured to determine whether or not the vehicle is a fraudulent vehicle on the basis of the point.

Advantageous Effect of Invention

According to an aspect of the present invention, s possible surmise a vehicle in which an RFID tag is being fraudulently used.

DESCRIPTION OF EMBODIMENTS

An embodiment of a charging system according to the present invention will be described with reference to FIGS. 1 to 6.

Overall Configuration

An overall configuration of a charging system 100 will be described below.

Figure 1:
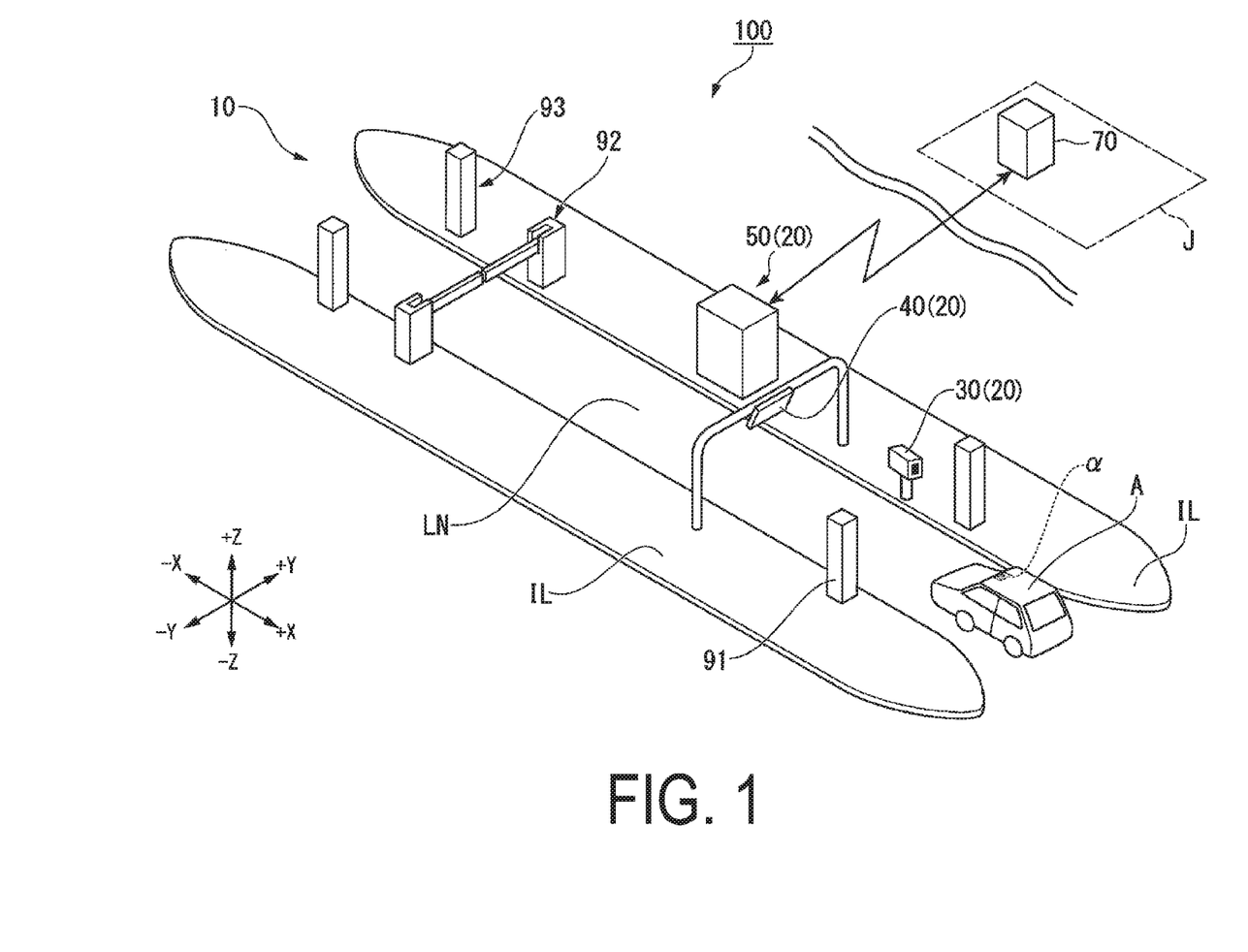
FIG. 1 is a schematic diagram of a charging system according to an embodiment of the present invention.

As illustrated in FIG. 1, the charging system 100 includes a toll collection facility 10 and a central payment processing device 70.

The toll collection facility 10 is provided at an exit tollgate (or an entry tollgate for some types of toll system) of an expressway, which is a toll road. The toll collection facility 10 is a facility for collecting, from a user of the expressway, a toil of an amount corresponding to a vehicle A that the user is driving.

In the charging system 100 provided at the exit tollgate, the vehicle A is traveling on a lane LN that extends from the expressway side to a general road side. Islands IL are laid on both sides of the lane LN. Various devices that configure the toll collection facility 10 are installed on the islands IL.

Hereinafter, the direction in which the lane LN extends (a ±X direction in FIG. 1) is referred to as a "lane direction." Further, the expressway side of the lane LN in the lane direction (the +X direction side in FIG. 1) is referred to as an "upstream side." Furthermore, the general road side of the lane LN in the lane direction (the −X direction side in FIG. 1) is referred to as a "downstream side."

Further, the width direction of the lane LN is referred to as a lane width direction (a ±Y direction in FIG. 1), and the height direction of the vehicle A is referred to as a vertical direction (a ±Z direction in FIG. 1).

As illustrated in FIG. 1, the toll collection facility 10 includes a vehicle identification system 20, an entry-side vehicle detector 91, a departure controller 92, and a departure-side vehicle detector 93.

The toll collection facility 10 is a device configured to perform wireless communication processing (hereinafter simply referred to as "wireless communication") with the vehicle A trying to pass through the exit tollgate, and perform charging processing corresponding to the type of the vehicle A.

The vehicle identification system 20 includes an imaging unit 30, an RFID reader 40 (a roadside communication device), and a charging communication processing device 50.

In the present embodiment, each of the devices of the toll collection facility 10 are provided on the roadside in order, from the upstream side to the downstream side, of the entry-side vehicle detector 91, the imaging unit 30, the RFID reader 40, the charging communication processing device 50, the departure controller 92, and the departure-side vehicle detector 93.

Figure 2:
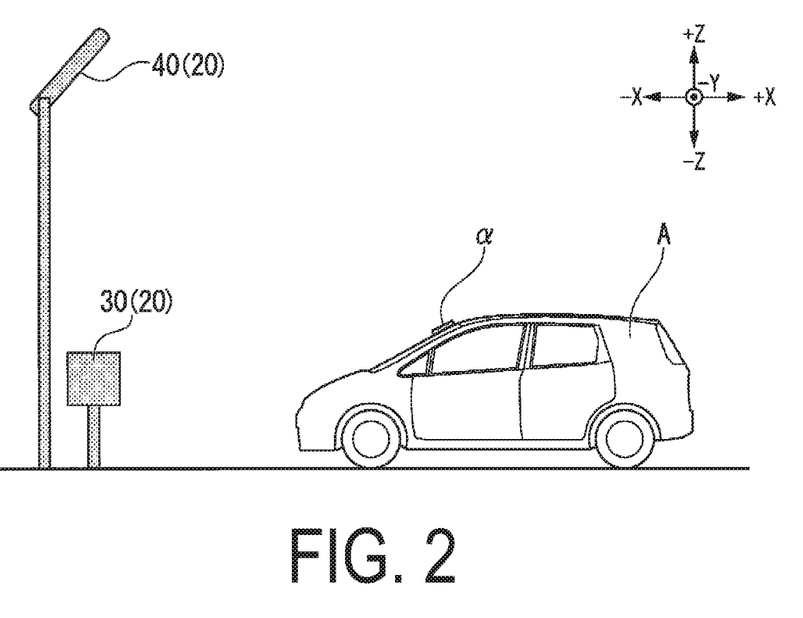
FIG. 2 is a schematic diagram of a vehicle identification system according to the embodiment of the present invention.

As illustrated in FIG. 2, the RFID reader 40 is installed above the traveling vehicle A.

The RFID reader 40 performs the wireless communication with an RFID tag α to be described below, and receives RFID information written onto the RFID tag α.

The RFID reader 40 is formed so as to be capable of transmitting and receiving electromagnetic waves in a predetermined frequency band (a UHF hand, a microwave frequency band, or the like), and performs the wireless communication, via the electromagnetic waves, with the RFID tag α mounted on the vehicle A that has arrived.

The charging communication processing device 50 is a processing unit that controls a series of charging processing by the toll collection facility 10. In the present embodiment, a program to be described below is executed, thus causing a computer to function as the charging communication processing device 50.

The charging communication processing device 50 receives information captured and acquired by the imaging unit 30 from the imaging unit 30, using wired or wireless communication. Further, the charging communication processing device 50 receives information received by the RFID reader 40 from the RFID reader 40, using wired or wireless communication.

As illustrated in FIG. 1, the charging communication processing device 50 outputs the acquired information, information of a decided charge amount, and the like to a central payment processing device 70 (a host device) installed at a remote location J, via a communication circuit.

The entry-side vehicle detector 91 determines the presence or absence of the vehicle A (the vehicle body) traveling along the lane LN, using a light projecting tower and a light receiving tower that are located on the islands IL so as to face each other across the lane LN in the lane width direction (the ±Y direction), thus detecting, as vehicle passage information, the passing (entry) of one vehicle at a predetermined position.

The departure controller 92 is located on the downstream side of the lane LN and is a device that controls the departure of the vehicle A traveling along the lane LN. For example, when the charging processing with the vehicle A has not been normally performed, the departure controller 92 closes the lane LN so as to restrict the departure of the vehicle A. When the charging processing with the vehicle A has been normally completed, the departure controller 92 opens the lane LN.

In the present embodiment, the toll collection facility 10 includes the departure controller 92, but when the toll collection facility 10 does not need to restrict the departure of the vehicle A, the toll collection facility 10 need not necessarily include the departure controller 92.

The departure-side vehicle detector 93 is located furthermost to the downstream side of the lane LN and detects the departure of the vehicle A from the toll collection facility 10.

Configuration of Imaging Unit

As illustrated in FIG. 2, the imaging unit 30 is provided at a position at which the vehicle body of the vehicle A that has entered the toll collection facility 10 can be captured from the front side in the travel direction. When the entry of the vehicle A is detected by the entry-side vehicle detector 91, the imaging unit 30 captures the vehicle A from the front side, and acquires image data including the license plate and the RFID tag α of the vehicle A.

Configuration of Roadside Communication Device

Figure 3:
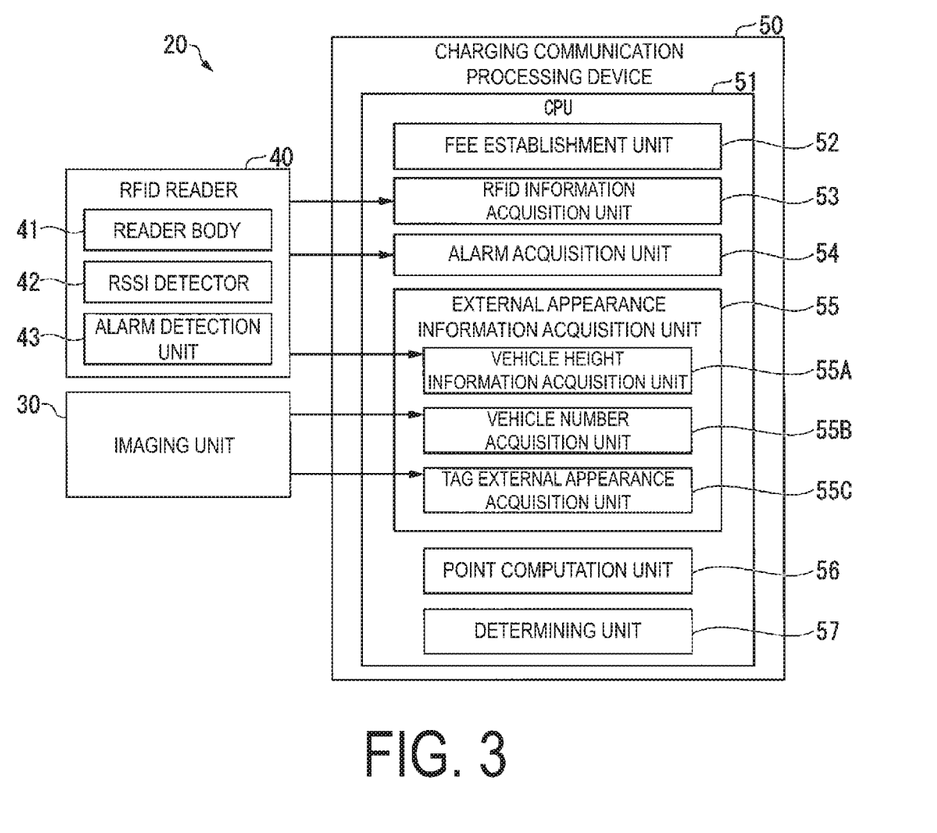
FIG. 3 is a block diagram of the vehicle identification system according to the embodiment of the present invention.

As illustrated in FIG. 3, the RFID reader 40 includes a reader body 41, an RSSI detector 42, and an alarm detection unit 43.

The reader body 41 receives the RFID information written onto the RFID tag α, from the RFID tag α mounted on the vehicle A that has entered the toll collection facility 10.

When the RFID information is received from RFID tag α, the RSSI detector 42 measures the received signal strength (RSSI) of the received electromagnetic waves.

As illustrated in FIG. 3, the alarm detection unit 43 acquires tamper alarm information detected by the RFID tag α, and transmits the acquired tamper alarm information to the charging communication processing device 50.

Figure 4:
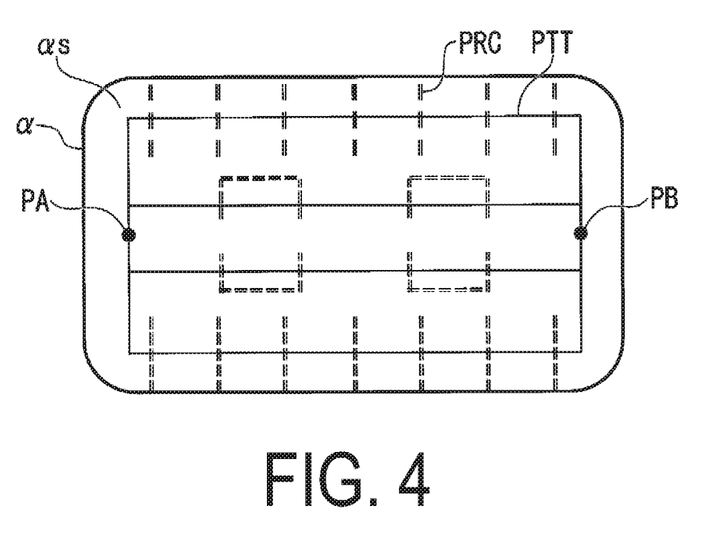
FIG. 4 is a diagram illustrating a configuration of an RFID tag.

For example, as illustrated in FIG. 4, the MD tag α of the present embodiment has a card shape, and is a sticker type RFID tag on which one of the card surfaces is an adhesive surface αs. The RFID tag α includes cuts PRC disposed across the entire card surface and a plurality of alarm detection patterns PTT extending across the cuts PRC. The alarm detection pattern PTT is formed using a conductive pattern. The RFID tag α detects the presence or absence of a disconnection of the alarm detection pattern PTT by electrically detecting the presence or absence of continuity between a point PA and a point PB of the alarm detection pattern PTT, and transmits, to the alarm detection unit 43, the tamper alarm information including a tamper alarm signal of "disconnection" or "no disconnection."

In a case where the RFID tag α is once adhered and then forcibly peeled off, the alarm detection pattern PTT is disconnected in a portion spanning the cuts PRC. At this time, the RFID tag a detects "disconnection" and generates the "disconnection" tamper alarm signal.

The tamper alarm information including the generated "disconnection" tamper alarm signal is sent to the alarm detection unit 43.

In FIG. 4, the plurality of alarm detection patterns PTT are connected in parallel between the point PA and the point PB. As a modified example, the plurality of alarm detection patterns PTT may be serially connected between the point PA and the point PB. As another modified example, the plurality of alarm detection patterns PTT between the point PA and the point PB may be a single one of the alarm detection patterns PTT.

Configuration of Charging Communication Processing Device

The charging communication processing device 50 includes a Central Processing Unit (CPU) 51. As illustrated in FIG. 3, the CPU 51 functionally includes a fee establishment unit 52, an RFID information acquisition unit 53, an alarm acquisition unit 54, an external appearance information acquisition unit 55, a point computation unit 56, and a determining unit 57.

The external appearance information acquisition unit 55 functionally includes a vehicle height information acquisition unit 55A, a vehicle number acquisition unit 55B, and a tag external appearance acquisition unit 55C.

In the present embodiment, by executing a program to be described later, the charging communication processing device 50 causes the CPU 51 to function as the fee establishment unit 52, the RFID information acquisition unit 53, the alarm acquisition unit 54, the external appearance information acquisition unit 55, the point computation unit 56, and the determining unit 57. Furthermore, by executing the program, the charging communication processing device 50 causes the external appearance information acquisition unit 55 to function as the vehicle height information acquisition unit 55A, the vehicle number acquisition unit 55B, and the tag external appearance acquisition unit 55C.

As a toll, the fee establishment unit 52 decides the toll of an amount corresponding to registration vehicle type information VCR, to be described later, identified by the RFID information acquisition unit 53.

In the present embodiment, the vehicle type information is stored in advance in the charging communication processing device 50 or the central payment processing device 70 in association with a vehicle type classification. In this way, the fee establishment unit 52 accesses the data stored in the charging communication processing device 50 or the central payment processing device 70, and identifies the vehicle type classification associated with the vehicle type information. For example, the vehicle type classification is classified into "compact vehicle," "standard vehicle," "intermediate vehicle," "large vehicle," "oversize vehicle," and the like.

Accordingly, the fee establishment unit 52 can decide the toll of the amount associated with the identified vehicle type classification.

The RFID information acquisition unit 53 acquires the RFID information written onto the RFID tag α detected by the RFID reader 40. In the present embodiment, a tag ID, which at least allows the RFID tag to be distinguished from another RFID tag, is written onto the RFID tag α. Thus, the RFID information acquisition unit 53 acquires the RFID information including the tag ID.

In the present embodiment, the tag ID is stored in the charging communication processing device 50 or the central payment processing device 70 in association with the vehicle type information registered in advance. In this way, the RFID information acquisition unit 53 accesses the data stored in the charging communication processing device 50 or the central payment processing device 70, and identifies, as the RFID information, the registration vehicle type information VCR associated with the acquired tag ID.

The alarm acquisition unit 54 acquires the tamper alarm information from the alarm detection unit 43 of the RFID reader 40.

The external appearance information acquisition unit 55 acquires a plurality of pieces of external appearance information from the RFID reader 40. This will be described in more detail below.

The vehicle height information acquisition unit 55A acquires estimated vehicle height information of the vehicle A, as external appearance information. In the present embodiment, the maximum RSSI is acquired as the estimated vehicle height information.

The vehicle height information acquisition unit 55A acquires the maximum RSSI, of the RSSI detected by the RSSI detector 42, from the RSSI detector 42 of the RFID reader 40. The RSSI becomes larger as the traveling vehicle A approaches the RFID reader 40 and reaches the maximum value as the vehicle A passes below the reader 40. After passing below the RFID reader 40, the detected RSSI becomes smaller as the traveling vehicle A moves away from the RFID reader 40. In the present embodiment, the vehicle height information acquisition unit 55A uses signal processing to identify the maximum value as the vehicle A passes below the RFID reader 40, and acquires the maximum value as the maximum RSSI.

The vehicle height information acquisition unit 55A further identifies vehicle type information VCX from the maximum RSSI. In the present embodiment, the maximum RSSI that can be acquired from a vehicle of each vehicle type is stored in advance in the charging communication processing device 50 or the central payment processing device 70 in association with the vehicle type information. In this way, the vehicle height information acquisition unit 55A accesses the data stored in the charging communication processing device 50 or the central payment processing device 70, and identifies the vehicle type information VCX associated with the acquired maximum RSSI.

The vehicle number acquisition unit 55B acquires vehicle number information of the vehicle A as the external appearance information.

In the present embodiment, the vehicle number acquisition unit 55B acquires the image data from the imaging unit 30. Using image processing, the vehicle number acquisition unit 55B acquires, from the acquired image data, the vehicle number displayed on the license plate of the vehicle A captured in the image data, as a detected vehicle number DNM.

The vehicle number acquisition unit 55B further identifies a registration vehicle number RNM from the tag ID acquired by the RFID information acquisition unit 53.

In the present embodiment, the tag ID is stored in the charging communication processing device 50 or the central payment processing device 70 in association with the vehicle number registered in advance. In this way, the vehicle number acquisition unit 55B accesses the data stored in the charging communication processing device 50 or the central payment processing device 70, and identifies the registration vehicle number RNM associated with the acquired tag ID.

The tag external appearance acquisition unit 55C acquires external appearance information of the RFID tag α as the external appearance information.

In the present embodiment, the tag external appearance acquisition unit 55C acquires the image data from the imaging unit 30. Using image processing, the tag external appearance acquisition unit 55C acquires, from the acquired image data, a color pattern or a reflective material pattern of the RFID tag α captured in the image data as a tag pattern TPN.

The tag external appearance acquisition unit 55C identifies vehicle type information VCY from the acquired tag pattern TPN. In the present embodiment, a tag pattern of the RFID tag of each vehicle type is stored in advance in the charging communication processing device 50 or the central payment processing device 70 in association with the vehicle type information. In this way, the tag external appearance acquisition unit 55C accesses the data stored in the charging communication processing device 50 or the central payment processing device 70, and identifies the vehicle type information VCY associated with the acquired tag pattern TPN.

For example, when the color patterns associated with the "standard vehicle," the "intermediate vehicle," and the "large vehicle" are "red," "blue," and "yellow," respectively, when the "yellow" color pattern is extracted as the tag pattern TPN, the vehicle type information VCY is identified as being the "large vehicle."

Further, when the reflective material patterns associated with the "standard vehicle," the "intermediate vehicle," and the "large vehicle," are "square," "triangular," and "circular," respectively, when the "square" reflective material pattern is acquired as the tag pattern TPN, the vehicle type information VCY is identified as being the "standard vehicle."

The point computation unit 56 determines a respective invalidity of a plurality of pieces of determination information that, include external appearance determination information in which the RFID information and the external appearance information are combined, and calculates points on the basis of the invalidity.

In the present embodiment, the point computation unit 56 determines, as the invalidity, an invalidity point P1 on the basis of the tamper alarm information.

Furthermore, as the respective invalidity, the point computation unit 56 determines an invalidity point P2 on the basis of the estimated vehicle height information, an invalidity point P3 on the basis of the vehicle number, and an invalidity point P4 on the basis of the external appearance pattern information of the RFID tag.

The determination of the invalidity point P1 based on the tamper alarm information will be described in detail.

The point computation unit 56 acquires the tamper alarm information as the determination information from the alarm acquisition unit 54.

In a case where the point computation unit 56 does not acquire the "disconnection" tamper alarm signal, as the alarm information, from the alarm acquisition unit 54, the point computation unit 56 determines that the invalidity point P1 is 0. When the point computation unit 56 acquires the "disconnection" tamper alarm signal, the point computation unit 56 determines that the invalidity point P1 is 1.

Thus, compared to the vehicle in which the RFID tag is installed that has not been peeled off after once being adhered, the vehicle in which the RFID tag is installed that has been peeled off as a result of fraudulent transfer has a larger value for the invalidity point P1.

The determination of the invalidity point P2 on the basis of the estimated vehicle height information will be described in detail.

The point computation unit 56 acquires the vehicle type information VCX identified by the vehicle height information acquisition unit 55A and the registration vehicle type information VCR identified by the RFID information acquisition unit 53, as the external appearance information. The point computation unit 56 compares the acquired vehicle type information VCX with the registration vehicle type information VCR.

In a case where the vehicle type information VCX and the registration vehicle type information VCR match each other, the point computation unit 56 determines that the invalidity point P2 is 0. In a case where the vehicle type information VCX and the registration vehicle type information VCR do not match each other, the point computation unit 56 determines that the invalidity point P2 is 1.

For example, since a truck that is a large vehicle has a larger vehicle height compared to a standard vehicle, the RFID tag α is closer to the RFID reader 40 when installed in the truck compared to when installed in the standard vehicle. As a result, the RSSI measured by the RSSI detector 42 of the RFID reader 40 increases when the RFID tag α is installed in the truck compared to when installed in the standard vehicle. Therefore, the vehicle height information acquisition unit 55A is more likely to identify the vehicle type information VCX as being the "large vehicle."

On the other hand, because the RFID tag α is registered as that of the standard vehicle, the registration vehicle type information VCR is identified as being the "standard vehicle."

Accordingly, for the truck in which the RFID tag α of the standard vehicle is installed as a result of fraudulent transfer, it is determined that the invalidity point P2 is 1, and the invalidity point P2 becomes a large value.

The determination of the invalidity point P3 on the basis of the vehicle number will be described in detail.

The point computation unit 56 acquires the registration vehicle number RNM and the detected vehicle number DNM identified by the vehicle number acquisition unit 55B as the external appearance information. Using information processing, the point computation unit 56 compares the acquired registration vehicle number RNM with the detected vehicle number DNM.

When the point computation unit 56 compares the registration vehicle number RNM with the detected vehicle number DNM and the registration vehicle number RNM and the detected vehicle number DNM match each other, the point computation unit 56 determines that the invalidity point P3 is 0. When the point computation unit 56 determines that the registration vehicle number RNM and the detected vehicle number DNM do not match each other, the point computation unit 56 determines that the invalidity point P3 is 1.

Here, a case is assumed in which the RFID tag α of the vehicle A has been fraudulently transferred to another vehicle, and the other vehicle on which the RFID tag α is mounted has passed through the toll collection facility 10.

In this case, the registration vehicle number associated with the tag ID is identified as the registration vehicle number RNM.

On the other hand, since the vehicle number displayed on the license plate of the other vehicle is identified as the detected vehicle number DNM, the vehicle number does not match the registration vehicle number RNM.

Thus, for the other vehicle on which RFID tag α is mounted after being fraudulently transferred, since the detected vehicle number DNM does not match the registration vehicle number RNM, it is determined that the invalidity point P3 is 1, and the invalidity point P3 becomes a large value.

The determination of the invalidity point P4 on the basis of the external appearance information of the RFID tag will be described in detail.

The point computation unit 56 acquires the vehicle type information VCY identified by the tag external appearance acquisition unit 55C and the registration vehicle type information VCR identified by the RFID information acquisition unit 53, as external appearance determination information. The point computation unit 56 compares the acquired vehicle type information VCY with the registration vehicle type information VCR.

In a case where the vehicle type information VCY and the registration vehicle type information VCR match each other, the point computation unit 56 determines that the invalidity point P4 is 0. In a case where the vehicle type information VCY and the registration vehicle type information VCR do not match each other, the point computation unit 56 determines that the invalidity point P4 is 1.

Here, a case is assumed in which the RFID tag α of the vehicle A has been fraudulently transferred to another vehicle, and a fraudulent process has been carried out on the RFID tag α, such as repainting the color pattern, replacing the color pattern, replacing the reflective material pattern, and the like, so that the RFID tag α matches the vehicle type of the other vehicle onto which the RFID tag α has been mounted.

In this case, the tag external appearance acquisition unit 55C identifies the vehicle type information associated with the repainted color pattern, the replaced color pattern, the replaced reflective material pattern, and the like as the vehicle type information VCY.

On the other hand, the RFID information acquisition unit 53 identifies the vehicle type information associated with the tag ID of the RFID tag α as the registration vehicle type information VCR.

As a result, the vehicle type information VCY and the registration vehicle type information VCR do not match each other.

Thus, when the other vehicle on which is mounted the RFID tag α that has been fraudulently processed attempts to pass through the toll collection facility 10, the vehicle type information VCY and the registration vehicle information VCR do not match each other, it is determined that the invalidity point P4 is 1, and the invalidity point P4 becomes a large value.

The point computation unit 56 calculates an overall point by integrating the invalidity points P1 to P4.

In this embodiment, the computation for calculating an overall point Pt is illustrated in Equation (1) below.

$$Pt = W1 \times P1 + W2 \times P2 + W3 \times P3 + W4 \times P4 \quad (1)$$

Here, W1 to W4 are weighting factors for each of the invalidity points P1 to P4. W1 to W4 are stored in the charging communication processing device 50 as preset values in association with the importance of each of the invalidity points, and can be set in advance. In this way, the overall point Pt is calculated while weighting each of the invalidity points.

The determining unit 57 determines whether the vehicle is a fraudulent vehicle based on the overall point Pt.

In the present embodiment, the determining unit 57 compares the overall point Pt with a preset determination value Pv.

As a result of the comparison, the determining unit 57 determines that it is the fraudulent vehicle when the total point Pt is greater than the determination value Pv. When the overall point Pt is not greater than the determination value Pv, the determining unit 57 determines that the vehicle is a normal vehicle.

The determination value Pv is stored in advance in the charging communication processing device 50 and can be set in advance.

When the determining unit 57 determines that the vehicle A is the fraudulent vehicle, the determining unit 57 registers information, as the fraudulent vehicle, about the vehicle A including the tag ID of the RFID tag installed in the vehicle A, by storing the information in the charging communication processing device 50 or the central payment processing device 70. In a case where the vehicle A is not determined to be the fraudulent vehicle, the information about the vehicle A including the tag ID of the installed RFID tag is registered, as the normal vehicle, by storing the information in the charging communication processing device 50 or the central payment processing device 70.

Other Modified Examples

In the present embodiment, the point computation unit 56 determines a two-level value of 0 and 1 for P1 to P4, but as a modified example, a value of three or more levels may be determined in relation to the possibility of the invalidity.

For example, in the case of the invalidity point P1, a case is assumed in which the RFID tag α individually detects the disconnection of the plurality of alarm detection patterns PTT and transmits the tamper alarm information including a plurality of the tamper alarm signals. In this case, in relation to a number of the "disconnection" tamper alarm signals, the point computation unit 56 may determine the invalidity point P1 using values of three or more levels. As a result, the point computation unit 56 can perform the determination such that the invalidity point P1 increases the more the RFID tag is repeatedly fraudulently peeled off.

Further, in the case of the invalidity point P3, in relation to a degree of matching between the registration vehicle number RNM and the detected vehicle number DNM, the point computation unit 56 determines the invalidity point P3 using values of three or more levels, such that the invalidity point P3 increases as the degree of matching decreases.

In a case where the RFID tag is replaced, the degree of matching between the registration vehicle number RNM and the detected vehicle number DNM is extremely small. Therefore, the point computation unit 56 can perform the determination such that the invalidity point P3 is larger when the RFID tag is replaced, compared with when the detected vehicle number DNM is erroneously detected due to image capture conditions, a dirty license plate or the like.

In the present embodiment, the RFID information acquisition unit 53 identifies the registration vehicle type information VCR from the tag ID, but as a modified example, the RFID reader 40 may be configured to acquire the vehicle type information written onto the RFID tag. In this case, the RFID information acquisition unit 53 acquires the vehicle type information detected by the RFID reader 40 as the registration vehicle type information VCR.

In the present embodiment, the imaging unit 30 is provided on the upstream side of the RFID reader 40, but as a modified example, the imaging unit 30 may be disposed at approximately the same position as the RFID reader 40 in the lane direction (the ±X direction) so as to be aligned side by side with the RFID reader 40 in the Y direction. As another modified example, the imaging unit 30 may be integrated into the RFID reader 40.

In this embodiment, the point computation unit 56 determines all of the invalidity points P1 to P4 and calculates the overall point Pt, but as a modified example, the point computation unit 56 may determine at least a plurality of invalidity points, among the invalidity points P1 to P4, and calculate the overall point Pt.

As another modified example, determinations relating to another invalidity other than the invalidity points P1 to P4 may be combined.

In the present embodiment, the RFID information acquisition unit 53, the alarm acquisition unit 54, the external appearance information acquisition unit 55, the point computation unit 56, and the determining unit 57 are provided in the charging communication processing device 50, but may be provided in the central payment processing device 70 as a modified example. In this case, all or any of RFID information acquisition unit 53, the alarm acquisition unit 54, the external appearance information acquisition unit 55, the point computation unit 56, and the determining unit 57 may be provided in the central payment processing device 70.

Charging Method

An embodiment of charging method according to the present invention will be described below, using the charging system 100. The charging method performs charging processing relating to the vehicle A, by wirelessly communicating with the RFID tag α with respect to the traveling vehicle A to which the RFID tag α is attached.

Figure 5:
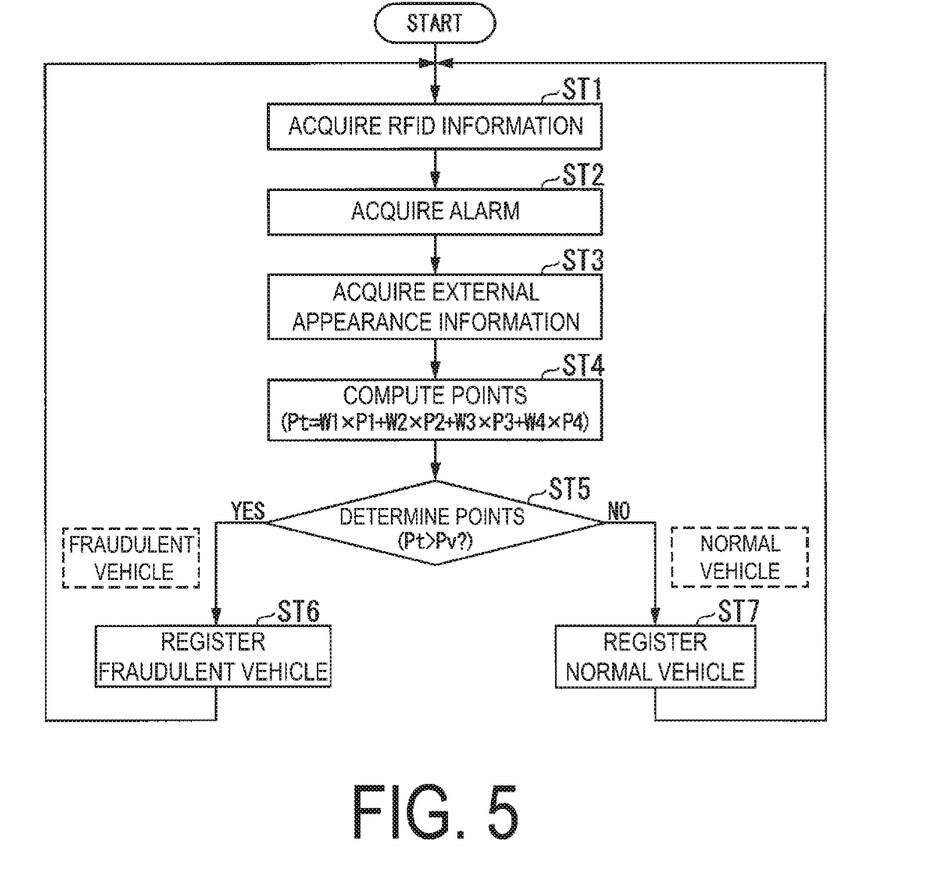
FIG. 5 is a flowchart of a charging method according to the embodiment of the present invention.

As illustrated in FIG. 5, the RFID information acquisition unit 53 acquires, from the RFID reader 40, the tag ID written onto the RFID tag α, as the RFID information (ST1: an RFID information acquiring step).

Next, the alarm acquisition unit 54 acquires, from the RFD reader 40, the tamper alarm information generated by the RFID tag α (ST2: an alarm acquiring step).

Next, the external appearance information acquisition unit 55 acquires, from the RFID reader 40, the external appearance information relating to the RFID tag α or a vehicle main body of the vehicle A (ST3: an external appearance information acquiring step). Specifically, the vehicle height information acquisition unit 55A acquires the maximum RSSI (estimated vehicle height information) on the basis of the received signal strength RSSI from the RFID tag α, the vehicle number acquisition unit 55B acquires the detected vehicle number DNM of the vehicle A using image processing, and the tag external appearance acquisition unit 55C acquires the tag pattern TPN (an external appearance pattern) using image processing.

Next, the point computation unit 56 acquires the plurality of pieces of determination information including the external appearance determination information in which the RFID information and the external appearance information are combined. The point computation unit 56 determines the invalidity points P1 to P4 on the basis of the plurality of pieces of determination information including the external appearance determination information in which the acquired RFID information and the external appearance information are combined, and calculates the overall point Pt on the basis of the invalidity points P1 to P4 and the weighting factors W1 to W4 (ST4: a point computing step).

Next, the determining unit 57 acquires the overall point Pt and the preset determination value Pv. The determining unit 57 determines whether it is the fraudulent vehicle on the basis of the acquired overall point Pt and the determination value Pv (ST5: a point determining step). Specifically, the overall point Pt and the determination value Pv are compared.

If, as a result of the comparison, the overall point Pt is greater than the determination value Pv (ST5: YES), the determining unit 57 determines the vehicle A to be the fraudulent vehicle and registers the vehicle A as the fraudulent vehicle in the charging communication processing device 50 or the central payment processing device 70 (ST6: a fraudulent vehicle registering step). At this time, the information about the vehicle A including the tag ID of the RFID tag α installed in the vehicle A is registered as the fraudulent vehicle.

If, as a result of the comparison, the overall point Pt is not greater than the determination value Pv (ST5: NO), the determining unit 57 determines the vehicle A to be the normal vehicle, and registers the vehicle A as the normal vehicle in the charging communication processing device 50 or the central payment processing device 70 (ST7: the normal vehicle registering step). At this time, the information about the vehicle A including the tag ID of the RFID tag a installed in the vehicle A is registered as the normal vehicle.

The charging method of the present embodiment may be performed while the vehicle A is passing through the toll collection facility 10, or may be performed after the vehicle A has passed through the toll collection facility 10.

The charging method of the present embodiment performs the external appearance information acquiring step ST3 after the alarm acquiring step ST2, but the alarm acquiring step ST2 may be performed after the external appearance information acquiring step ST3, or may be performed simultaneously.

Hardware Configuration

An example of a hardware configuration of the charging communication processing device 50 according to the above-described embodiment will be described.

Figure 6:
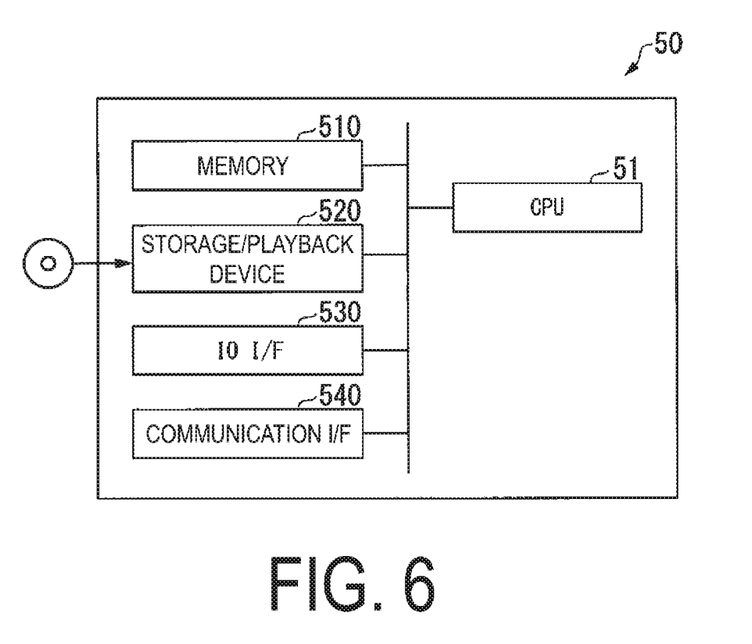
FIG. 6 is a diagram illustrating an example of a hardware configuration of a charging communication processing device according to the embodiment of the present invention.

FIG. 6 is a diagram illustrating an example of the hardware configuration of the charging communication processing device 50.

As illustrated in FIG. 6, in addition to the CPU 51, the charging communication processing device 50 further includes a memory 510, a storage/playback device 520, an Input Output interface (IO I/F) 530, and a communication Interface (I/F) 540.

The memory) is a medium such as a Random Access Memory (RAM) that temporarily stores data and the like used by the programs of the charging communication processing device 50.

The storage/playback device 520 is a device for storing data and the like in an external medium such as a CD-ROM, a DVD, or a flash memory, playing back data from the external medium, and the like.

The IO I/F 530 is an interface for inputting and outputting information and the like between the charging communication processing device 50 and the various devices of the toll collection facility 10.

The communication I/F 540 is an interface that performs communication between the charging communication processing device 50 and the central payment processing device 70 via a communication circuit such as the Internet, a dedicated communication circuit, or the like.

Actions and Effects

The actions and effects of present embodiment will be described.

The charging system 100 determines, using a point system, each of the plurality of pieces of determination information including the external appearance determination information in which the RFID information and the external appearance information are combined.

Thus, the charging system 100 can determine the vehicle in which the RFID tag is being fraudulently used, from the plurality of pieces of determination information, without relying on the single external appearance information.

Accordingly, the charging system 100 can surmise the vehicle in which the RFID tag is being fraudulently used.

The charging system 100 can determine the fraudulent vehicle without adding a sensor for measuring the shape of the main vehicle body in order to identify the registration vehicle type information VCR from the RFID information.

Since the charging system 100 calculates the overall point Pt by integrating the invalidity points P1 to P4, the charging system 100 can perform the determination by collectively handling the respective invalidities.

In addition, since the charging system 100 assigns weighting to the invalidity points P1 to P4, the charging system 100 can perform the determination while weighting the respective invalidity.

In the charging system 100, the determination value Pv and the weighting factors can be set, and therefore, the determination is possible in accordance with operational conditions of the present embodiment.

Since the charging system 100 calculates the points on the basis of the tamper alarm information, the charging system 100 can detect whether the RFID tag has been peeled off in the past.

Thus, the charging system 100 can determine the fraudulent vehicle in which the RFID tag is installed that has been fraudulently peeled off in order to be transferred.

In this case, the transfer of the RFID tag need not necessarily be immediately determined to be the fraudulent vehicle. In a case where the vehicle is not immediately determined to be the fraudulent vehicle, for example, the transfer of the RFID tag that is a non-fraudulent operation, such as the transfer of the RFID tag between the same vehicle types, can be tolerated.

Since the estimated vehicle height information is acquired as the external appearance information, the charging system 100 can determine the fraudulent vehicle having a vehicle height that is different from that of the vehicle type identified by the RFID information.

Since the vehicle number is acquired as the external appearance information, the charging system 100 can determine the fraudulent vehicle having a vehicle number that is different, from the vehicle number identified by the RFID information.

Since the external appearance of the RFID tag is acquired as the external appearance information, the charging system 100 can determine the fraudulent vehicle in which the RFID tag is installed that has the different external appearance to the stored information.

In the embodiments described above, the various processes are implemented by a program for achieving the various functions of the charging communication processing device, the program being recorded in a computer-readable storage medium, and the program recorded in the storage medium being read and executed by a computer system. The steps of each process of each CPU described above are stored in a computer readable recording medium in the form of a program, and these various processes are implemented by the computer reading out and executing this program. Examples of the computer-readable recording medium include magnetic disks, magneto-optical disks, CD-ROMs, DVD-ROMs, and semiconductor memories. This computer program may be distributed to the computer on a communication line, and the computer that receives this distribution may execute the program.

Moreover, a mode may be employed in which various functions of the charging communication processing device are provided in a plurality of devices connected by a network.

In the foregoing, certain embodiments of the present invention have been described, but these embodiments are merely illustrative and are not intended to limit the scope of the invention. These embodiments may be implemented in various other forms, and various omissions, substitutions, and alterations may be made without departing from the gist of the invention. These embodiments and modifications are included in the scope and gist of the invention and are also included in the scope of the invention described in the claims and equivalents thereof.

INDUSTRIAL APPLICABILITY

According to an aspect of the present invention, it is possible to surmise a vehicle in which an RFID tag is being fraudulently used.

REFERENCE SIGNS LIST

10 Toll collection facility
20 Vehicle identification system
30 Imaging unit
40 RFID reader
41 Reader body
42 RSSI detector
43 Alarm detection unit
50 Charging communication processing device
51 CPU
52 Fee establishment unit
53 RFID information acquisition unit
54 Alarm acquisition unit
55 External appearance information acquisition unit
55A Vehicle height information acquisition unit
55B Vehicle number acquisition unit
55C Tag external appearance acquisition unit
56 Point computation unit
57 Determining unit
70 Central payment processing device
91 Entry-side vehicle detector
92 Departure controller
93 Departure-side vehicle detector
100 Charging system
510 Memory
520 Playback device
530 IO I/F
540 Communication I/F
A Vehicle
IL Island
J Remote location
LN Lane
PRC Cut
PTT Alarm detection pattern
α RFID tag
αs Adhesive surface

The invention claimed is:

1. A charging system that communicates with an RFID tag on a traveling vehicle in which the RFID tag is installed, and performs charging processing in relation to the vehicle, the charging system comprising:
an RFID information acquisition unit configured to acquire RFID information written onto the RFID tag detected by a roadside communication device that communicates with the RFID tag;
an external appearance information acquisition unit configured to acquire external appearance information relating to one of the RFID tag and a vehicle body of the vehicle;
a point computation unit configured to determine a respective invalidity of each of a plurality of pieces of determination information including external appearance determination information in which the RFID information and the external appearance information are combined, and to calculate a point on the basis of the invalidity; and
a determining unit configured to determine whether or not the vehicle is a fraudulent vehicle on the basis of the point.

2. The charging system according to claim 1, wherein the point computation unit determines each of invalidity points as the respective invalidity, and calculates an overall point by integrating the invalidity points.

3. The charging system according to claim 2, wherein the point computation unit calculates the overall point while applying weighting to each of the invalidity points.

4. The charging system according to claim 1, further comprising:
an alarm acquisition unit configured to acquire tamper alarm information detected by the RFID tag, wherein the point computation unit calculates the point on the basis of the tamper alarm information in addition to the invalidity.

5. The charging system according to claim 1, wherein the external appearance information acquisition unit includes a vehicle height information acquisition unit configured to acquire estimated vehicle height information on the basis of a received signal strength from the RFID tag, as the external appearance information.

6. The charging system according to claim 1, wherein the external appearance information acquisition unit includes a vehicle number acquisition unit configured to acquire a vehicle number of the vehicle, using image processing, as the external appearance information.

7. The charging system according to claim 1, wherein the external appearance information acquisition unit includes a tag external appearance acquisition unit configured to acquire an external appearance pattern of the RFID tag, using image processing, as the external appearance information.

8. A charging method for communicating with an RFID tag on a traveling vehicle in which the RFID tag is installed, and performing charging processing in relation to the vehicle, the charging method comprising:
- an RFID information acquiring step for acquiring RFID information written onto the RFID tag detected by a roadside communication device that communicates with the RFID tag;
- an external appearance information acquiring step for acquiring external appearance information relating to one of the RFID tag and a vehicle body of the vehicle;
- a point computing step for determining a respective invalidity of each of a plurality of pieces of determination information including external appearance determination information in which the RFID information and the external appearance information are combined, and for calculating a point on the basis of the invalidity; and
- a point determining step for determining whether or not the vehicle is a fraudulent vehicle on the basis of the point.

9. A program causing a computer of a charging system that communicates with an RFID tag on a traveling vehicle in which the RFID tag is installed, and performs charging processing in relation to the vehicle, to function as:
- an RFID information acquisition unit configured to acquire RFID information written onto the RFID tag detected by a roadside communication device that communicates with the RFID tag;
- an external appearance information acquisition unit configured to acquire external appearance information relating to one of the RFID tag and a vehicle body of the vehicle;
- a point computation unit configured to determine a respective invalidity of each of a plurality of pieces of determination information including external appearance determination information in which the RFID information and the external appearance information are combined, and to calculate a point on the basis of the invalidity; and
- a determining unit configured to determine whether or not the vehicle is a fraudulent vehicle on the basis of the point.

* * * * *